(12) United States Patent
Wu

(10) Patent No.: US 8,469,153 B2
(45) Date of Patent: Jun. 25, 2013

(54) TAXI DISPATCHING TO A REGION

(75) Inventor: Jen-Chang Wu, Taipei (TW)

(73) Assignee: Shih Pi Ta Technology Ltd., Taipei (TW)

( * ) Notice: Subject to any disclaimer, the term of this patent is extended or adjusted under 35 U.S.C. 154(b) by 300 days.

(21) Appl. No.: 12/822,752

(22) Filed: Jun. 24, 2010

(65) Prior Publication Data

US 2011/0000747 A1    Jan. 6, 2011

(30) Foreign Application Priority Data

Jul. 3, 2009   (TW) ............................. 98122624 A

(51) Int. Cl.
*B66B 1/20* (2006.01)

(52) U.S. Cl.
USPC ............................ 187/383; 187/387; 187/247

(58) Field of Classification Search
USPC   187/247, 380–389, 391–393; 705/7.11–7.14, 705/7.22, 13; 701/116–119, 32.3, 33.4, 410, 701/411, 420–422, 482, 532, 533; 340/8.1, 340/988–994
See application file for complete search history.

(56) References Cited

U.S. PATENT DOCUMENTS

| | | | | | |
|---|---|---|---|---|---|
| 4,007,812 A | * | 2/1977 | Nelson, Jr. | ............ | 187/383 |
| 4,846,311 A | * | 7/1989 | Thangavelu | ............ | 187/383 |
| 5,272,288 A | * | 12/1993 | Kameli | ............ | 187/387 |
| 5,317,114 A | * | 5/1994 | Pullela et al. | ............ | 187/383 |
| 5,331,121 A | * | 7/1994 | Tsuji | ............ | 187/388 |
| 5,480,005 A | * | 1/1996 | Bittar | ............ | 187/383 |
| 5,480,006 A | * | 1/1996 | Kameli et al. | ............ | 187/383 |
| 5,511,634 A | * | 4/1996 | Bahjat et al. | ............ | 187/383 |
| 5,799,263 A | * | 8/1998 | Culbertson | ............ | 701/117 |
| 5,932,852 A | * | 8/1999 | Tyni et al. | ............ | 187/382 |
| 5,945,919 A | * | 8/1999 | Trask | ............ | 340/8.1 |
| 5,973,619 A | * | 10/1999 | Paredes | ............ | 340/994 |
| 6,601,678 B2 | * | 8/2003 | Kostka et al. | ............ | 187/383 |
| 6,756,913 B1 | * | 6/2004 | Ayed | ............ | 340/992 |
| 6,808,049 B2 | * | 10/2004 | Brand et al. | ............ | 187/383 |
| 6,976,560 B2 | * | 12/2005 | Newby | ............ | 187/383 |
| 7,490,698 B2 | * | 2/2009 | Sirag, Jr. | ............ | 187/381 |
| 2006/0034201 A1 | * | 2/2006 | Umeda et al. | ............ | 370/310 |
| 2011/0099040 A1 | * | 4/2011 | Felt et al. | ............ | 705/7.12 |
| 2012/0130627 A1 | * | 5/2012 | Islam et al. | ............ | 701/300 |
| 2012/0232943 A1 | * | 9/2012 | Myr | ............ | 705/7.13 |
| 2012/0323642 A1 | * | 12/2012 | Camp et al. | ............ | 705/13 |

FOREIGN PATENT DOCUMENTS

| | | |
|---|---|---|
| EP | 0 971 301 A2 | 1/2000 |
| JP | 9-153098 A | 6/1997 |
| TW | I258592 B | 7/2006 |
| TW | I265278 B | 11/2006 |

* cited by examiner

*Primary Examiner* — Anthony Salata
(74) *Attorney, Agent, or Firm* — Muncy, Geissler, Olds & Lowe, PLLC

(57) ABSTRACT

The present invention is related to a dispatching system for car assignment method. The method includes: (a) setting a set number based a history data, wherein the history data records a time and a location of each dispatching car event happening, the set number is an average number of dispatching car events that happen in a special time segment and in the region; (b) determining whether or not the first number is larger than the set number; (c) not issuing a dispatching car information when the first number is larger than the set number; and (d) issuing a dispatching car information and assigning a second number of cars to the region when the first number is less than the set number. Moreover, a dispatching apparatus to perform the dispatching car method is also provided.

13 Claims, 8 Drawing Sheets

|  | 2/2 | 2/9 | 2/16 | average |
|---|---|---|---|---|
| 7 : 00 ~ 8 : 00 | 30 | 25 | 23 | 26 |
| 8 : 01 ~ 9 : 00 | 29 | 30 | 28 | 29 |
| 9 : 01 ~ 10 : 00 | 50 | 45 | 40 | 45 |
| ⋮ | ⋮ | ⋮ | ⋮ | ⋮ |

Fig. 3

TAXI DISPATCHING TO A REGION

RELATED APPLICATIONS

This application claims priority to Taiwan Application Serial Number 98122624, filed Jul. 3, 2009, which is herein incorporated by reference.

BACKGROUND

1. Field of Invention

The present invention relates to a system and a method for dispatching. More particularly, the present invention relates to a system and a method for dispatching cars.

2. Description of Related Art

Typical taxi drivers drive their own cars to find their own passengers. However, such a business model is very inefficient because it often occurs that many taxis are concentrated in a special business region to find passengers. In this case some taxis located in the special business region cannot find passengers and the passengers located out of the special business region cannot find a taxi. Therefore, a dispatching company integrates many taxis to solve the above problem.

Typically, a global positioning system is used to position the locations of the cars that can carry passengers of the dispatching company. Message deliver terminal, MDT, also called car machine, is disposed in each car of the cars that can carry passengers to communicate with the global positioning system. When a dispatching car event happens, the dispatching company can assign a car to satisfy this event based on the locations of the cars.

According to the dispatching model, a car sends its location data to the dispatching company. Therefore, the dispatching company can know each car location. When a passenger calls the dispatching company to require a car, the dispatching company broadcasts the dispatching car information to the drivers. At this time, when a car that can carry passenger is near the passenger and the car is not carrying any passengers, the driver can make a response to the company to take this passenger.

According to the typical method, the dispatching company assigns the car to the passenger only when the passenger calls to the company to require a car. That is, only when the dispatching company receives a dispatching car call, an assigned driver can have this business. However, in many cases, the passengers do not call the dispatching company to require a car service. They stand on the roadside to look for a car for service. That is, the typical dispatching method cannot get this business because the passengers do not call the dispatching company. On the other hand, because a dispatching car event usually happens in a business region compared with a residential area, the drivers always drive their cars in the business region to find passengers, which makes it hard for the passenger in the residential area to find a car to provide service.

Therefore, it is a target to improve the service quality.

SUMMARY

The present invention provides a car assignment apparatus and method thereof. According to the present invention, dispatching car information is issued to drivers when the number of the cars that can carry passengers in a region is less than a set number or a dispatching car event happens. Therefore, the driver can decide whether or not to go to this region before insufficient car situation happens in this region.

Accordingly, the present invention provides a car assignment method for assigning a car to a region. The region includes a first number of cars. The method comprises the following steps: (a) setting a set number based a history data, wherein the history data records a time and a location of each dispatching car event happening, the set number is an average number of dispatching car events that happen in a special time segment, wherein the special time segment is related to the traffic, weather an so on, and in the region; (b) is determining whether or not the first number is larger than the set number; (c) not issuing a dispatching car information when the first number is larger than the set number; and (d) issuing a dispatching car information and assigning a second number of cars to the region when the first number is less than the set number.

The second number of cars is determined by the formula:

$$\text{insufficient number} \times \text{parameter} + N$$

wherein the insufficient number is the difference between the set number and the first number, the N is the basic number to assign a car to this region, wherein the N and the parameter are related to the region.

According to another embodiment, the present invention provides a car assignment method for assigning a car to a region. The region includes a first number of cars. The method comprises the following steps: (a) setting a set number based a history data, wherein the history data records a time and a location of each dispatching car event happening, the set number is an average number of dispatching car events that happen in a special time segment and in the region; (b) determining whether or not the first number is larger than the set number, wherein a dispatching car information is not issued when the first number is larger than the set number, and wherein a dispatching car information is issued and assigns a second number of cars to the region when the first number is less than the set number; (c) determining whether or not a dispatching car event happens in the region, wherein a dispatching car information is not issued when the dispatching car event does not happen in the region, and wherein the step (b) is performed again when the dispatching car is event happens in the region; and (d) determining whether or not a response is made to the dispatching car event, wherein a dispatching car information is not issued when a response to the dispatching car event is made, and wherein a dispatching car information is issued and assigned a third number of cars to the region when a response to the dispatching car event is not made.

The second number of cars is determined by the formula:

$$\text{insufficient number} \times \text{parameter} + N$$

wherein the insufficient number is the difference between the set number and the first number, the N is the basic number to assign a car to this region, wherein the N and the parameter are related to the region.

The third number of cars is determined by the formula:

$$\text{unsuccessful response number} \times \text{parameter} + N$$

wherein the unsuccessful response number is a number of dispatching car events that is not made response to in a time segment, the N is the basic number to assign a car to this region, wherein the N and the parameter are related to the region.

According to another embodiment, the present invention provides a car assignment apparatus for assigning a car to a region. The apparatus comprises a plurality of car machines disposed in a plurality of cars respectively, wherein the car machines detect location data of the cars; a receiving/sending server communication with the car machines through a base station, the car machines send the location data to the receiving/sending server; a car position calculation unit timely gathering the positions from the receiving/sending server to identify positions of the cars; a parameter database for storing the positions of the cars; a calculation server timely gathers the positions of the cars from the parameter is database to calculate a first number of the car in a region and compares the first number with a set number to decide a difference number between the first number and the set number; and a dispatching center assigning a second number car to the region when the first number is less than the set number.

The car machines communicate with the calculation server through the receiving/sending server and the base station. The first number, the set number and the difference number are shown in a display of the car machine.

Accordingly, the present invention can issue dispatching car information to drivers when a number of the cars that can carry passengers in this region is less than a set number or a dispatching car event happens. Therefore, the driver can decide whether or not go to this region to provide service. Moreover, the present invention can immediately inform a driver go to a region when a dispatching car event happens and a response to this event is not made successfully. Accordingly, the present invention can prevent an insufficient car situation to happen in this region.

BRIEF DESCRIPTION OF THE DRAWINGS

The invention can be more fully understood by reading the following detailed description of the embodiments, with reference made to the accompanying drawings as follows:

FIG. 3 illustrates a history data of cars assigned to a region on Monday of the past weeks.

DETAILED DESCRIPTION

The present invention provides a dispatching system for car assignment and method thereof. The present invention can provide a driver with real time information of a number of the cars that can carry passengers and a number of necessary cars in a region. Therefore, the driver can know the car situation in this region before he decides to go to this region. That is, based on this information, the driver can decide whether or not go to this region by himself. Moreover, the dispatching system stores the car assignment history record. Therefore, the dispatching system also can assign a car to this region actively based on the history record. On the other hand, the dispatching system also can assign a car to this region based on real-time dispatching car information. The following examples will explain the application of the claimed invention. However, the following examples do not limit the application of the claimed invention.

Figure 1:
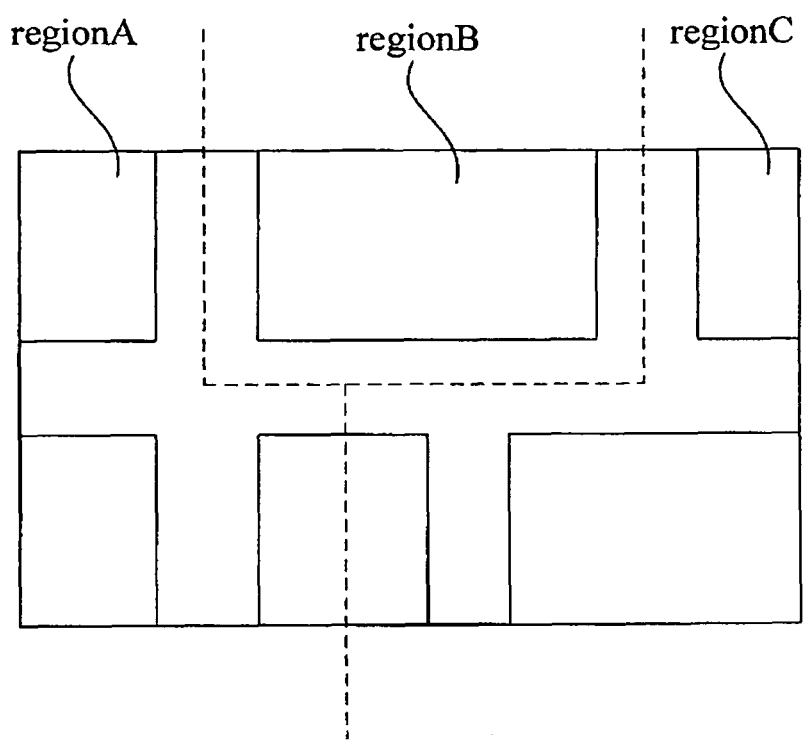
FIG. 1 illustrates a schematic diagram for separating a region to a plurality of regions based on the road direction according to an embodiment of the present invention.

FIG. 1 illustrates a schematic diagram for separating a region to a plurality of regions based on the road direction according to an embodiment of the present invention. The region is separated by a dot line into a region A, a region B and a region C in FIG. 1. By separating this region, a driver can clearly understand which region, the region A, the region B or the region C he is located and which region, the region A, the region B or the region C, has not enough cars that can carry passengers.

Figure 2:
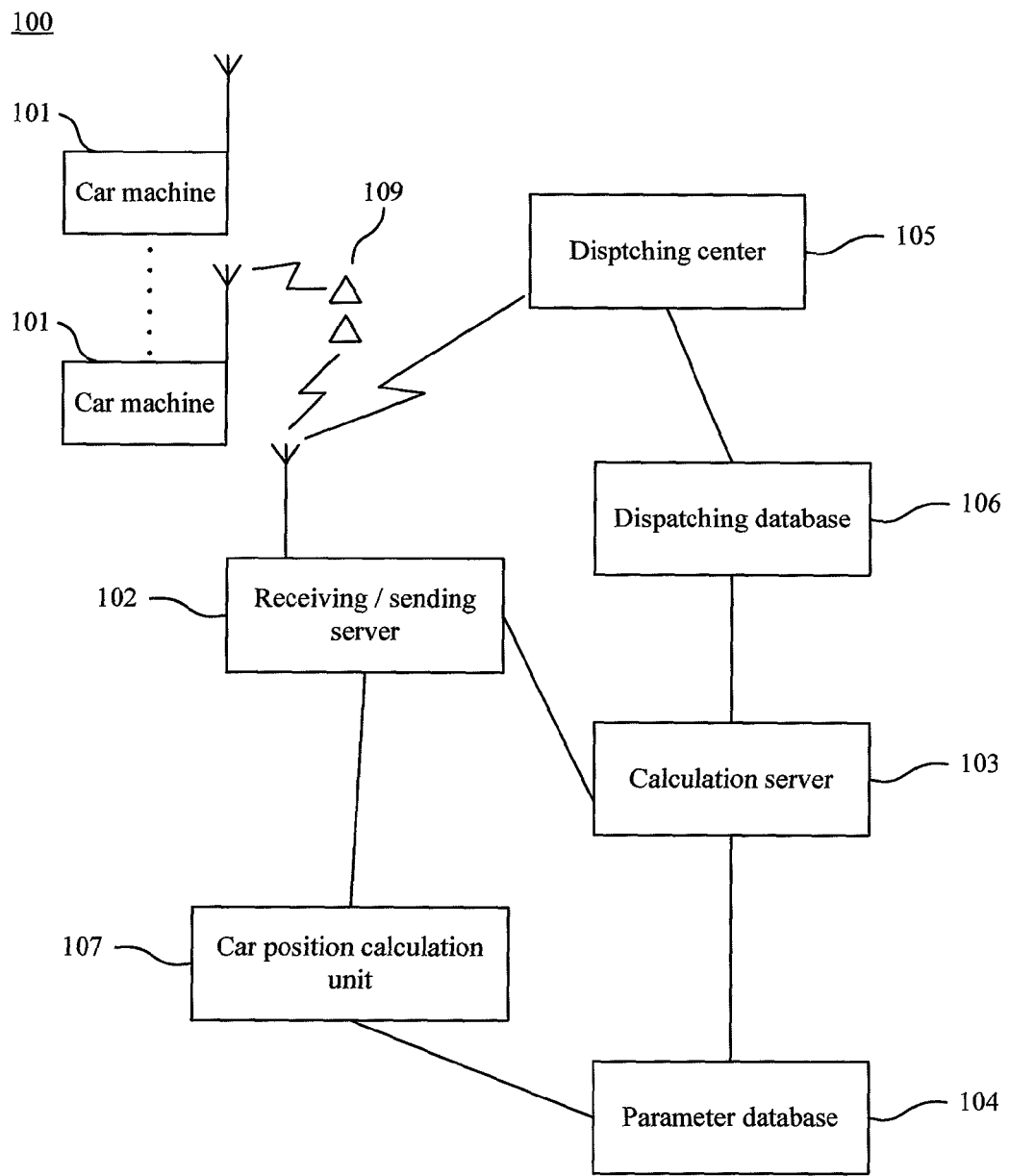
FIG. 2 illustrates a schematic diagram of a dispatching system.

FIG. 2 illustrates a schematic diagram of a dispatching system. The dispatching system includes a plurality of car machine 101, a receiving/sending server 102, a calculation server 103, a parameter database 104, a dispatching center 105, a dispatching database 106 and a car position calculation unit 107. The car machines 101 are disposed in cars respectively to communicate with the receiving/sending server 102 through the base station 109. The car machines 101 send car position information to the receiving/sending server 102. The car position calculation unit 107 timely gathers the position information from the receiving/sending server 102 to generate the position data of the cars that can carry passengers. The position data of the cars that can carry passengers is stored in the parameter database 104. Moreover, the number of cars that provides business in each region, the region A, the region B or the region C, is also stored in the parameter database 104. The calculation server 103 timely gathers the position data generated by the car position calculation unit 107 from the parameter database 104 to calculate the number of cars that can carry passengers in each region.

The number of cars that can carry passengers is compared with a set number to decide an insufficient number of cars that can carry passengers by the calculation server 103. The insufficient number is sent back to the parameter database 104 and is applied to a formula to generate an assigning number that represents the number of cars required to assign to the region. The assigning number is stored in the parameter database 104. The dispatching center 105 can broadcast the dispatching car information to the drivers through the receiving/sending server 102 and base station 109 and assign the cars to this region based on the assigning number. In another embodiment, the calculation server 103 can directly broadcast the dispatching car information to the drivers and assign the cars to this region through the receiving/sending server 102 and base station 109. The broadcast region is based on the radius of the region in this embodiment. However, in another embodiment, the broadcast region can be enlarged or narrowed. Moreover, in an embodiment, the center point to broadcast is set in a position of a car outside the region. Both the parameter database 104 and the dispatching database 106 are coupled to the calculation server 103.

In a first embodiment, the dispatching database 106 stores the history data of cars assigned to a region, the region A, the region B or the region C. The calculation server 103 can calculate a history average number of the cars assigned to this region each hour each day in the past weeks. This history average number is used as a set number to compare with a number of the cars that can carry passengers in this region to decide an assigning number.

FIG. 3 illustrates a history data of cars assigned to a region, the region A, the region B or the region C, on Monday of the past weeks. This history data is stored in the dispatching server 106. The calculation server 103 gathers the data stored in the dispatching server 106 to generate a history average number. For example, when a history average number is generated by using the history data of cars assigned to a region in a one-hour time segment, such as 7:00 to 8:00, the calculation server 103 will average the values, 30, 25 and 23, in 7:00 to 8:00 to generate the history average number, 26. In this case, the history average number, 26, is used as a set number to compare with a number of cars that can carry passengers in this region in 7:00 to 8:00 to determine whether or not additional cars that can carry passengers should be assigned to this region. That is, when the number of cars that can carry passengers in this region is less than the history average number, 26, additional cars that can carry passengers will be assigned to this region. At this time, the dispatching center 105 or the calculation server 103 can broadcast the dispatching car information to the drivers through the receiving/sending server 102 and base station 109 and assign the cars to this region. It is noticed that the time segment can be enlarged or narrowed based on the region characteristic in another embodiment. For example, the time segment is narrowed to 30 minutes because the number of cars required to assign to a business section is much changed. In contrary, the time segment is enlarged to 3 hours because the number of cars required to assign to the residential area is almost same.

The number of cars for the dispatching center 105 or the calculation server 103 to inform the dispatching car information is determined by the following formula:

insufficient number×parameter+N

The insufficient number is decided by comparing the number of the cars that can carry passengers in this region with a set number. In this embodiment, the set number is the history average number. For example, in a special time segment, wherein the special time segment is related to the traffic, weather an so on, the number of car that can carry passengers in the region is 23. The is history average number is 26. The insufficient number is 3.

The parameter is a compensation value to compensate the number of cars that are assigned to this region but do not go. For example, the drivers give response that they will go to this region, but, finally, some of the drivers do not go to this region. This parameter is used to compensate this difference. In an embodiment, the parameter is 2.

N is the basic number to assign cars to this region. In an embodiment, N is 16. Therefore, 22 cars will receive the dispatching car information in this region from the dispatching center 105 or the calculation server 103. That is, in the time segment, 7:00 to 8:00, the number of car that can carry passengers in this region is 23 that is less than the number of history average number, 26. Therefore, additional cars that can carry passengers will be assigned to this region to provide service. At this time, the dispatching center 105 or the calculation server 103 broadcast dispatching car information to the drivers and assign 22 cars to this region through the receiving/sending server 102 and base station 109. The broadcast region is based on the radius of the region in this embodiment. However, in another embodiment, the broadcast region can be enlarged or narrowed. Moreover, in an embodiment, the center point to broadcast is set in a position of a car outside the region.

Figure 4:
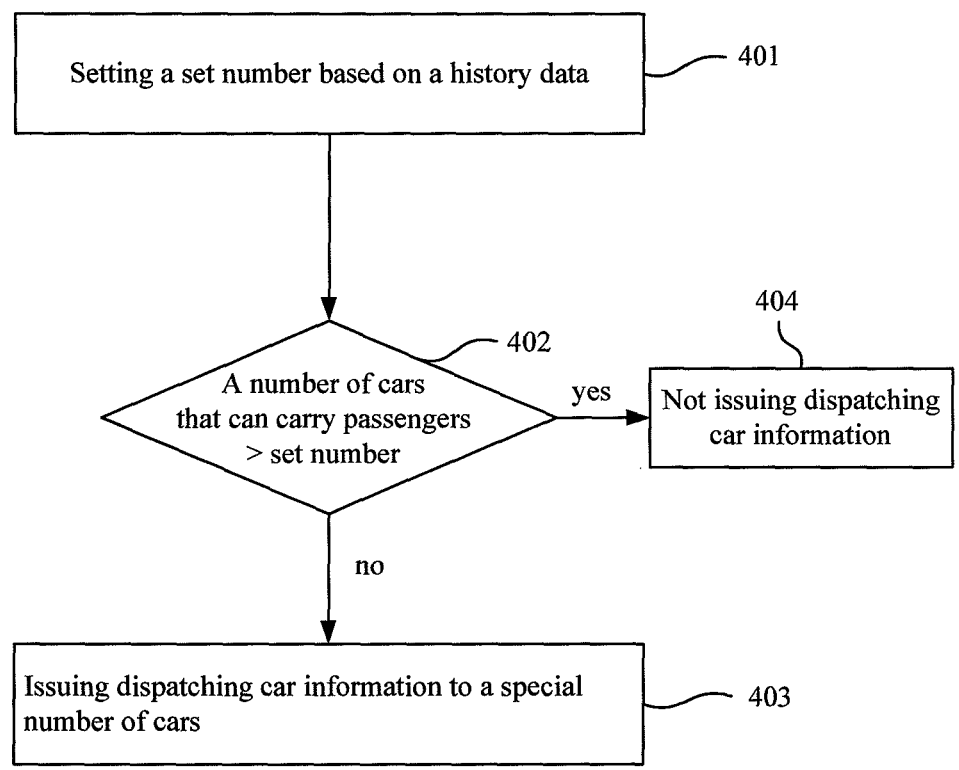
FIG. 4 illustrates a flow chart according to a first embodiment of the present invention.

FIG. 4 illustrates a flow chart according to a first embodiment of the present invention. FIG. 2 and FIG. 4 are referred in here.

In step 401, a set number is set based on a history data. In an embodiment, the dispatching database 106 stores the history data of cars assigned to a region. The calculation server 103 can calculate a history average number of the cars assigned to this region each hour of each day in the past weeks. This history average number is used as a set number.

In step 402, a determination step is performed to determine whether or not a number of the cars that can carry passengers in this region is larger than the set number. In an embodiment, the calculation server 103 timely gathers the position data generated by the car position calculation unit 107 from the parameter database 104 to calculate the number of the cars that can carry passengers in this region. The number of the cars that can carry passengers in this region is compared with a set number, the history average number, to decide whether or not additional cars that can carry passengers should be assigned to this region.

When the number of the cars that can carry passengers in this region is larger than the set number, the dispatching center 105 or the calculation server 103 does not broadcast dispatching car information to the drivers through the receiving/sending server 102 and base station 109 in step 404. In contrast, when the number of the cars that can carry passengers in this region is less than the set number, the dispatching center 105 or the calculation server 103 broadcasts dispatching car information to the drivers in step 403 and assign cars to this region through the receiving/sending server 102 and base station 109.

The number of the cars for the dispatching center 105 or the calculation server 103 to broadcast the dispatching car information is determined by the following formula:

insufficient number×parameter+N

The insufficient number is decided by comparing the number of the cars is that can carry passengers in a region with the set number. In an embodiment, the set number is the history average number. For example, in a special time segment, wherein the special time segment is related to the traffic, weather an so on, the number of cars that can carry passengers in the region is 23. The history average number is 26. The insufficient number is 3.

The parameter is a compensation value to compensate the number of cars that are assigned to this region but not go. For example, the drivers give response that they will go to this region, but, finally, some of the drivers do not go to this region. This parameter is used to compensate this difference.

N is the basic number to assign cars to this region.

In the second embodiment, the dispatching database 106 stores a real time dispatching car event. When the calculation server 103 finds a real time dispatching car event in the dispatching database 106, that means a dispatching car event happens in a region, the calculation server 103 gathers the position data generated by the car position calculation unit 107 from the parameter database 104 to calculate the number of the cars that can carry passengers in this region. The number of the cars that can carry passengers in this region is compared with a set number, a history average number, to decide whether or not additional cars that can carry passengers should be assigned to this region.

For example, when the number of the cars that can carry passengers in this region is larger than the set number, the dispatching center 105 or the calculation server 103 does not broadcast dispatching car information to the drivers through the receiving/sending server 102 and base station 109. In contrast, when the number of the cars that can carry passengers in this region is less than the set number, the dispatching center 105 or the calculation server 103 broadcasts dispatching car information to the drivers and assign cars to this region through the receiving/sending server 102 and base station 109. The broadcast region is based on the radius of the region in this embodiment. However, in another embodiment, the broadcast region can be enlarged or narrowed. Moreover, in an embodiment, the center point to broadcast is set in a position of a car outside the region.

The number of the cars for the dispatching center 105 or the calculation server 103 to broadcast the dispatching car information is determined by the following formula:

insufficient number×parameter+N

The insufficient number is decided by comparing the number of the cars that can carry passengers in a region with the set number.

In an embodiment, the set number is the history average number. For example, in a special time segment, wherein the special time segment is related to the traffic, weather an so on, the number of cars that can carry passengers in the region is 23. The history average number is 26. The insufficient number is 3.

The parameter is a compensation value to compensate the number of cars that are assigned to this region but not go. For example, the drivers give response that they will go to this region, but, finally, some of the drivers do not go to this region. This parameter is used to compensate this difference.

N is the basic number to assign cars to this region.

However, in another embodiment, the first embodiment and the second embodiment have different parameter and N value. For example, when the first embodiment and the second embodiment are performed together, the parameter and the N value of the second embodiment are amended to be less than that in the first embodiment.

In this embodiment, the calculation server 103 immediately compares the number of the cars that can carry passengers in this region with a set number, such as a history average number, to decide whether or not to issue a dispatching car information as long as a dispatching car event happens. However, in the first embodiment, the calculation server 103 timely compares the number of the cars that can carry passengers in this region with a history average number to decide whether or not to issue a dispatching car information no matter whether or not a dispatching car event happens. The first embodiment and the second embodiment can be individually performed. That is, the calculation server 103 is triggered only when a dispatching car event happens in this embodiment. Or, the calculation server 103 is timely triggered in the first embodiment.

Moreover, the first embodiment and the second embodiment are performed together. That is, the calculation server 103 is timely triggered to decide whether or not the number of the cars that can carry passengers in this region is less than a history average number and to decide whether or not to issue a dispatching car information. And, when a dispatching car event happens, the calculation server 103 is triggered again to decide whether or not the number of the cars that can carry passengers in this region is less than a history average number and to decide whether or not to issue a dispatching car information.

Figure 5:
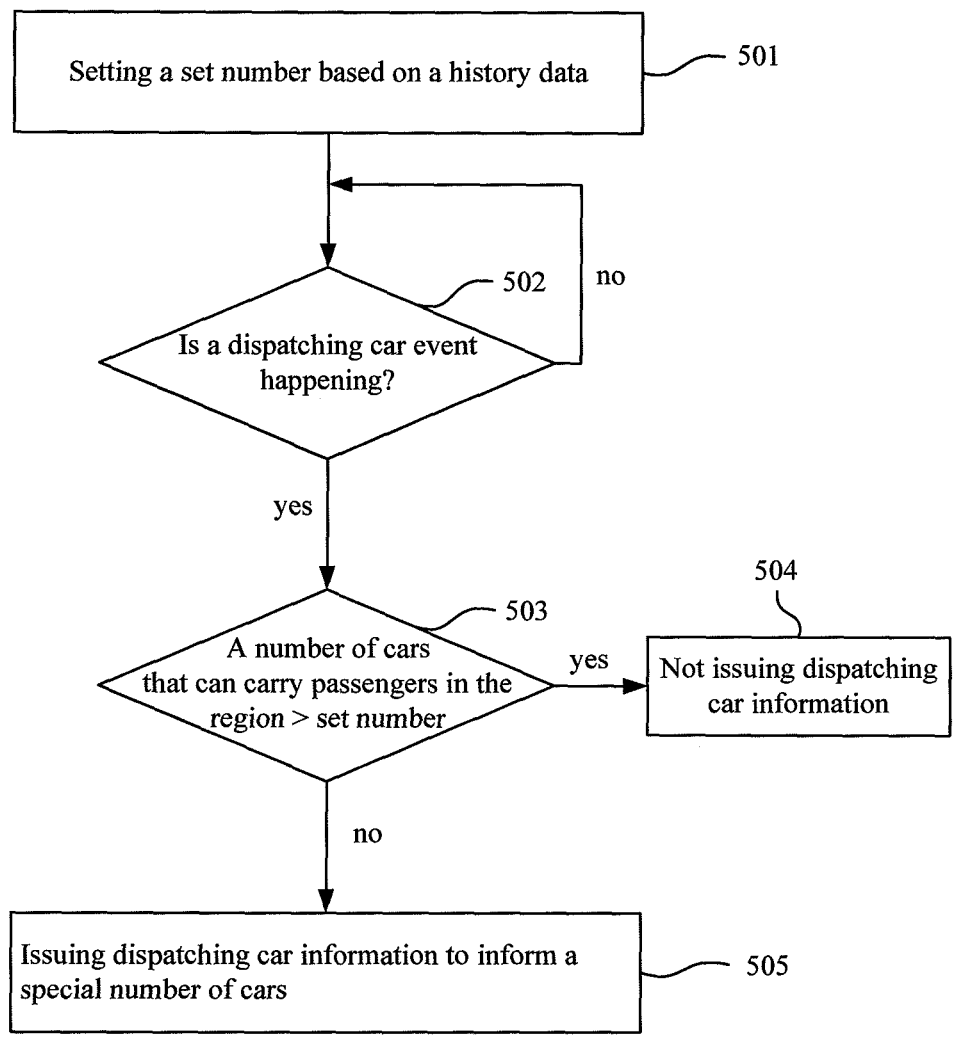
FIG. 5 illustrates a flow chart of the second embodiment of the present invention.

FIG. 5 illustrates a flow chart of the second embodiment of the present invention. FIG. 2 and FIG. 5 are referred in here.

In step 501, a set number is set based on a history data. In an embodiment, the dispatching database 106 stores the history data of cars assigned to a region. The calculation server 103 can calculate a history average number of the cars assigned to this region each hour each day in the past weeks. This history average number is used as a set number.

In step 502, a determination step is performed to determine whether or not a dispatching car event happens.

When a dispatching car event happens, step 503 is performed. In step 503, a determination step is performed to determine whether or not a number of cars that can carry passengers in this region is larger than a set number. In an embodiment, the calculation server 103 gathers the position data generated by the car position calculation unit 107 from the parameter database 104 to calculate the number of the cars that can carry passengers in this region. The number of the cars that can carry passengers in this region is compared with a set number, such as a history average number, to decide whether or not additional cars that can carry passengers should be assigned to this region.

When the number of the cars that can carry passengers in this region is larger than the set number, the dispatching center 105 or the calculation server 103 does not broadcast a dispatching car information to the drivers through the receiving/sending server 102 and base station 109 in step 504. In contrast, when the number of the cars that can carry passengers in this region is less than the set number, the dispatching center 105 or the calculation server 103 broadcasts dispatching car information to the drivers in step 505 and assign cars to this region through the receiving/sending server 102 and base station 109.

The broadcast region is based on the radius of the region in this embodiment. However, in another embodiment, the broadcast region can be enlarged or narrowed. Moreover, in an embodiment, the center point to broadcast is set in a position of a car outside the region.

The number of the cars for the dispatching center 105 or the calculation server 103 to broadcast the dispatching car information is determined by the following formula:

insufficient number×parameter+N

The insufficient number is decided by comparing the number of the cars that can carry passengers in a region with the set number.

In an embodiment, the set number is the history average number. For example, in a special time segment, wherein the special time segment is related to the traffic, weather an so on, the number of cars that can carry passengers in the region is 23. The history average number is 26. The insufficient number is 3.

The parameter is a compensation value to compensate the number of cars that are assigned to this region but do not go. For example, the drivers give response that they will go to this region, but, finally, some of the drivers do not go to this region. This parameter is used to compensate this difference.

N is the basic number to assign cars to this region.

In this embodiment, the calculation server 103 immediately compares the number of the cars that can carry passengers in this region with a set number, such as a history average number, to decide whether or not to issue a dispatching car information as long as a dispatching car event happens. However, in another embodiment, the dispatching car events must happen several times in a time segment, such as two times in five minutes, then, the calculation server 103 is triggered to decide whether or not the number of the cars that can carry passengers in this region is less than a history average number and to decide whether or not to issue a dispatching car information.

In the third embodiment, the calculation server 103 not only detects whether or not a real time dispatching car event is in the dispatching database 106 but also detects whether or not a response to this dispatching car event is made successfully. When the calculation server 103 detects a real time dispatching car event in the dispatching database 106 but the response is not successful, that means this dispatching car event happens in a region, however, no car that can carry passengers can provide service. In this case, the dispatching center 105 or the calculation server 103 is forced to broadcast the dispatching car information to the drivers and assign cars to this region through the receiving/sending server 102 and base station 109. The broadcast region is based on the radius of the region in this embodiment. However, in another embodiment, the broadcast region can be enlarged or narrowed. Moreover, in an embodiment, the center point to broadcast is set in a position of a car. In other words, in this embodiment, the calculation server 103 does not perform this step to compare the number of the cars that can carry passengers in this region with a set number, such as a history average number, to decide whether is or not to issue a dispatching car information.

The number of the cars for the dispatching center 105 or the calculation server 103 to broadcast the dispatching car information is determined by the following formula:

unsuccessful response number×parameter+N

The unsuccessful response number is a number that a response to a real time dispatching car event is not made successfully. In this third embodiment, when a response to a real time dispatching car event is not made successfully one time, the dispatching center 105 or the calculation server 103 is forced to broadcast the dispatching car information to the drivers and assign cars to this region through the receiving/sending server 102 and base station 109. That is, the unsuccessful response number is 1.

However, in another embodiment, the dispatching car events must happen several times and these events are not responded to successfully in a time segment. For example, two dispatching car events happen and both events are not responded to successfully in five minutes. Then, the dispatching center 105 or the calculation server 103 is forced to broadcast the dispatching car information to the drivers and assign cars to this region through the receiving/sending server 102 and base station 109. That is, in this embodiment, the unsuccessful response number is 2

The parameter is a compensation value to compensate the number of the cars that are assigned to this region but not go. For example, the drivers give response that they will go to this region, but, finally, some of the drivers do not go to this region. This parameter is used to compensate this difference. In this embodiment, the parameter is 2.

N value is the basic number to assign cars to this region. In this embodiment, N value is 20. Accordingly, when two dispatching car events happen and both events are not responded to successfully in five minutes, the dispatching center 105 or the calculation server 103 is forced to broadcast the dispatching car information to the drivers and assign 20 cars to this region through the receiving/sending server 102 and base station 109.

Figure 6:
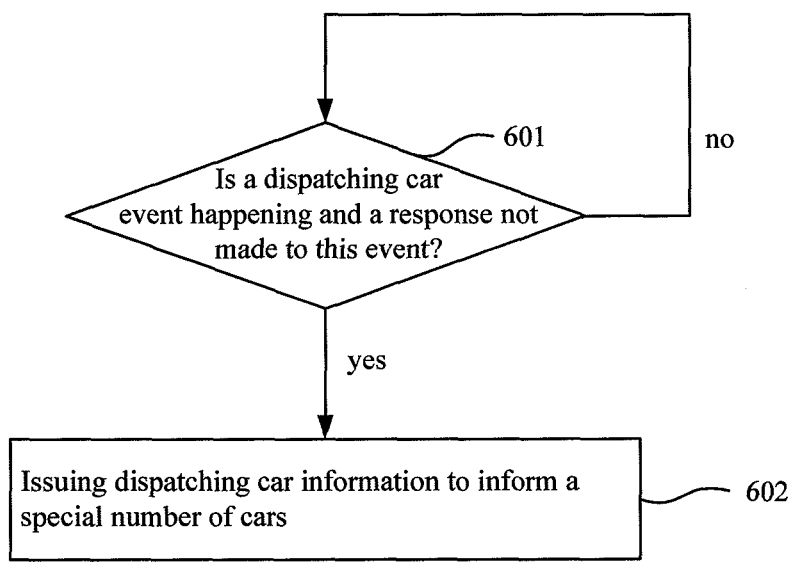
FIG. 6 illustrates a flow chart of the third embodiment of the present invention.

FIG. 6 illustrates a flow chart of the third embodiment of the present invention. FIG. 2 and FIG. 6 are referred in here.

In step 601, a determination step is performed to determine whether or not a dispatching car event happens and a response to this event is not made successfully.

When a dispatching car event happens and a response to this event is made successfully, step 601 is performed again. When a dispatching car event happens and a response to this event is not made successfully, step 602 is performed. In step 602, a dispatching car information is forced to issue to the drivers. For example, the dispatching center 105 or the calculation server 103 is forced to broadcast a dispatching car information to the drivers and assign cars to this region through the receiving/sending server 102 and base station 109.

The broadcast region is based on the radius of the region in this embodiment. However, in another embodiment, the broadcast region can be enlarged or narrowed. Moreover, in an embodiment, the center point to broadcast is set in a position of a car outside the region.

The number of the cars for the dispatching center 105 or the calculation server 103 to broadcast the dispatching car information is determined by the following formula:

unsuccessful response number×parameter+N

The unsuccessful response number is a number that a response to a real time dispatching car event is not made successfully.

The parameter is a compensation value to compensate the number of the cars that are assigned to this region but not go. For example, the drivers give response that they will go to this region, but, finally, some of the drivers do not go to this region. This parameter is used to compensate this difference. N value is the basic number to assign car to this region.

The first embodiment, the second embodiment and the third embodiment can be individually performed. The third embodiment and the first embodiment also can be performed together. In this case, the calculation server 103 is timely triggered to decide whether or not the number of the cars that can carry passengers in this region is less than a history average number and to decide whether or not to issue a dispatching car information. And, when a dispatching car event happens and a response to this even is not made successfully, the dispatching center 105 or the calculation server 103 is forced to broadcast a dispatching car information to the drivers and assign cars to this region through the receiving/sending server 102 and base station 109.

The third embodiment and the second embodiment also can be performed together. In this case, when a dispatching car event happens, the calculation server 103 is triggered to decide whether or not the number of the cars that can carry passengers in this region is less than a history average number and to decide whether or not to issue a dispatching car information. And, when a dispatching car event happens and a response to this event is not made successfully, the dispatching center 105 or the calculation server 103 is forced to broadcast a dispatching car information to the drivers and assign cars to this region through the receiving/sending server 102 and base station 109.

Moreover, the first embodiment, the second embodiment and the third embodiment can be performed together. In this case, the calculation server 103 is timely triggered to decide whether or not the number of the cars that can carry passengers in this region is less than a history average number and to decide whether or not to issue a dispatching car information. And, when a dispatching car event happens, the calculation server 103 is triggered again to decide whether or not the number of the cars that can carry passengers in this region is less than a history average number and to decide whether or not to issue a dispatching car information. And, when a dispatching car event happens and a response to this event is not made successfully, the dispatching center 105 or the calculation server 103 is forced to broadcast a dispatching car information to the drivers and assign cars to this region through the receiving/sending server 102 and base station 109.

Figure 7:
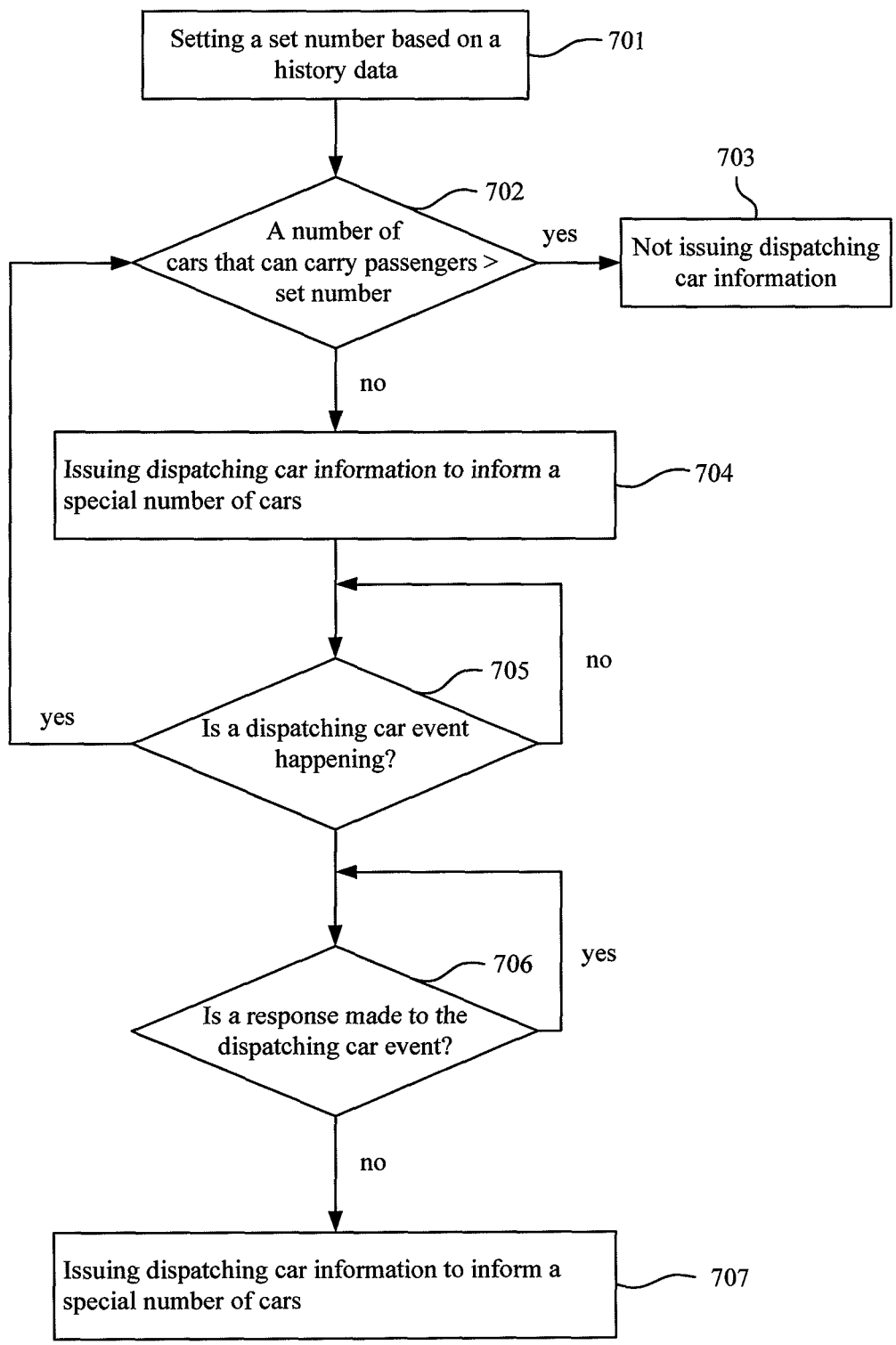
FIG. 7 illustrates a flow chart of the first embodiment, the second embodiment and the third embodiment that are performed together.

FIG. 7 illustrates a flow chart of the first embodiment, the second embodiment and the third embodiment that are performed together. FIG. 2 and FIG. 7 are referred together.

In step 701, a set number is set based on a history data. In an embodiment, the dispatching database 106 stores the history data of cars assigned to a region. The calculation server 103 can calculate a history average is number of the cars assigned to this region each hour each day in the past weeks. This history average number is used as a set number.

In step 702, a determination step is performed to determine whether or not a number of the cars that can carry passengers in this region is larger than the set number. In an embodiment, the calculation server 103 timely gathers the position data generated by the car position calculation unit 107 from the parameter database 104 to calculate the number of the cars that can carry passengers in this region. The number of the cars that can carry passengers in this region is compared with a set number, the history average number, to decide whether or not additional cars that can carry passengers should be assigned to this region.

When the number of the cars that can carry passengers in this region is larger than the set number, the dispatching center 105 or the calculation server 103 does not broadcast dispatching car information to the drivers through the receiving/sending server 102 and base station 109 in step 703. In contrast, when the number of the cars that can carry passengers in this region is less than the set number, the dispatching center 105 or the calculation server 103 broadcasts dispatching car information to the drivers in step 704 and assign cars to this region through the receiving/sending server 102 and base station 109.

The number of the cars for the dispatching center 105 or the calculation server 103 to broadcast the dispatching car information is determined by the following formula:

$$\text{insufficient number} \times \text{parameter} + N$$

The insufficient number is decided by comparing the number of the cars that can carry passengers in a region with the set number. In an embodiment, the set number is the history average number. The parameter is a compensation value to compensate the number of cars that are assigned to this region but not go. For example, the drivers give response that they will go to this region, but, finally, some of the drivers do not go to this region. This parameter is used to compensate this difference. N is the basic number to assign cars to this region.

Next, in step 705, a determination step is performed to determine whether or not a dispatching car event happens. When a dispatching car event happens, step 702 is performed again to determine whether or not a number of the cars that can carry passengers in this region is larger than the set number. In contrary, step 705 is performed when no dispatching car event happen.

In step 706, a determination step is performed to determine whether or not a dispatching car event happens and a response to this event is not made successfully.

When a dispatching car event happens and a response to this event is made successfully, step 706 is performed again. When a dispatching car event happens and a response to this event is not made successfully, step 707 is performed. In step 707, a dispatching car information is forced to issue to the drivers. For example, the dispatching center 105 or the calculation server 103 is forced to broadcast a dispatching car information to the drivers and assign cars to this region through the receiving/sending server 102 and base station 109. The broadcast region is based on the radius of the region in this embodiment. However, in another embodiment, the broadcast region can be enlarged or narrowed. Moreover, in an embodiment, the center point to broadcast is set in a position of a car outside the region.

The number of the cars for the dispatching center 105 or the calculation server 103 to broadcast the dispatching car information is determined by the following formula:

$$\text{unsuccessful response number} \times \text{parameter} + N$$

The unsuccessful response number is a number that a response to a real time dispatching car event is not made successfully.

The parameter is a compensation value to compensate the number of the cars that are assigned to this region but not go. For example, the drivers give response that they will go to this region, but, finally, some of the drivers do not go to this region. This parameter is used to compensate this difference.

N value is the basic number to assign car to this region.

On the other hand, a driver can check the car assignment information of every region through the car machine 101 disposed in his car. Therefore, the driver can decide whether or not go to a region to provide server by himself. In an embodiment, the calculation server 103 announces the information of a number of cars that can carry passengers and a number of necessary cars in a region. This information is sent to the car machine through the receiving/sending server 102 and base station 109. Therefore, a driver can check the car machine to know this information.

Figure 8:
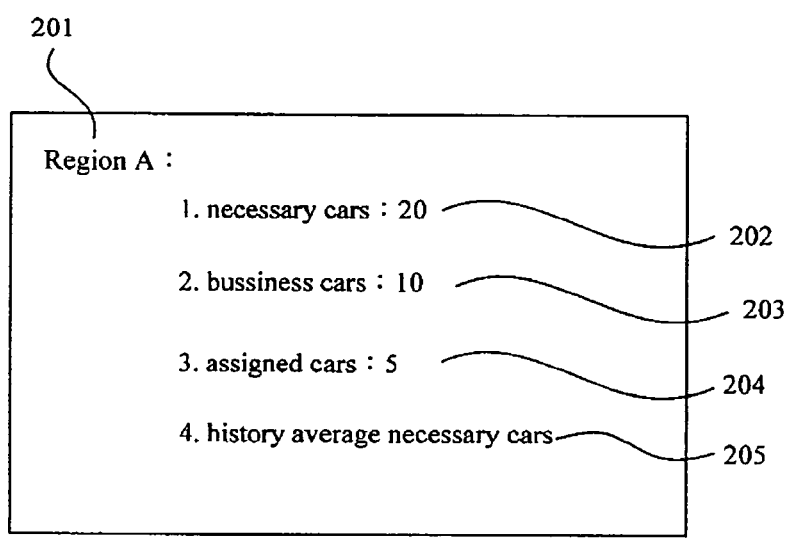
FIG. 8 illustrates the information displayed in the display of a car machine.

FIG. 8 illustrates the information displayed in the display of a car machine. The information displayed in a car machine 101, as shown in FIG. 2, includes a name of this region 201, a number of necessary cars 202 in this region, a number of cars that can carry passengers 203 in the region and a number of assigned cars 204 in the region. In an embodiment, the name of this region 201 is region A. The number of necessary cars 202 in region A is 20. The number of cars that can carry passengers 203 in region A is 10. The number of assigned cars 204 to region A is 5. Because the number of necessary cars 202 in region A is larger than the number of cars that can carry passengers 203 in region A and the number of assigned cars 204, the driver can decide whether or not go to region A to provide service by himself. It is noticed that the information displayed in the display is not limited by this embodiment.

The present invention can issue a dispatching car information to drivers when a number of the cars that can carry passengers in this region is less than a set number or a dispatching car event happens. Therefore, the driver can decide whether or not to go to this region to provide service. Moreover, the present invention can immediately inform a driver to go to a region when a dispatching car event happens and a response to this event is not made successfully. Accordingly, the present invention can prevent an insufficient car situation from happening in this region.

Although the present invention has been described in considerable detail with reference to certain embodiments thereof, other embodiments are possible. Therefore, it will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A car assignment method for assigning a car to a region, wherein the region includes a first number of cars, comprising:
   (a) setting a set number based a history data, wherein the history data records a time and a location of each dispatching car event happening, the set number is an average number of dispatching car events that happen in a special time segment and in the region;
   (b) determining whether or not the first number is larger than the set number, wherein a dispatching car information is not issued when the first number is larger than the set number, and wherein a dispatching car information is issued and assigns a second number of cars to the region when the first number is less than the set number;

(c) determining whether or not a dispatching car event happens in the region, wherein a dispatching car information is not issued when the dispatching car event does not happen in the region, and wherein the step (b) is performed again when the dispatching car event happens in the region; and (d) determining whether or not a response is made to the dispatching car event, wherein a dispatching car information is not issued when a response to the dispatching car event is made, and wherein a dispatching car information is issued and assigned a third number of cars to the region when a response to the dispatching car event is not made.

2. The car assignment method of claim 1, wherein the second number of cars is determined by the formula:

insufficient number×parameter +N wherein the insufficient number is the difference between the set number and the first number, the N is the basic number to assign cars to this region, wherein the N and the parameter are related to the region.

3. The car assignment method of claim 1, wherein the third number of cars is determined by the formula:

unsuccessful response number×parameter +N wherein the unsuccessful response number is a number of dispatching car events that is not made response to in a time segment, the N is the basic number to assign cars to this region, wherein the N and the parameter are related to the region.

4. The car assignment method of claim 1, wherein the unsuccessful response number is two dispatching car events that are not responded to in five minutes.

5. A car assignment apparatus for assigning a car to a region, comprising:
a plurality of car machines disposed in a plurality of cars respectively, wherein the car machines detect location data of the cars;
a receiving/sending server communication with the car machines through a base station, the car machines send the location data to the receiving/sending server;
a car position calculation unit timely gathering the positions from the receiving/sending server to identify positions of the cars;
a parameter database for storing the positions of the cars;
a calculation server timely gathers the positions of the cars from the parameter database to calculate a first number of the cars in a region and compares the first number with a set number to decide a difference number between the first number and the set number;
a dispatching center assigning a second number of cars to the region when the first number is less than the set number; and
a dispatching database to store a history data and a dispatching car event, wherein the history data records a time and a location of each dispatching car event happening, the set number is an average number of dispatching car events happens in a special time segment and in the region.

6. The car assignment apparatus of claim 5, wherein the difference number is sent back to the parameter database and the difference number is applied to a formula to decide a number of cars that are informed dispatching car information, wherein the number of cars that are informed dispatching car information is determined by the formula:

difference number×parameter +N wherein the difference number is the difference between the set number and the first number, the N is the basic number to assign cars to this region, wherein the N and the parameter are related to the region.

7. The car assignment apparatus of claim 6, wherein the car machines communicate with the calculation server through the receiving/sending server and the base station.

8. The car assignment apparatus of claim 7, wherein the first number, the set number and the difference number are shown in a display of the car machine.

9. The car assignment apparatus of claim 5, wherein the special time segment is one hour.

10. The car assignment apparatus of claim 5, wherein when the calculation server detects the dispatching database has a dispatching car event happen in a region, the calculation server gathers the positions of the cars from the parameter database to calculate a second number of the cars in the region and compares the second number with the set number to decide a difference number between the second number and the set number.

11. The car assignment apparatus of claim 5, wherein when the calculation server detects the dispatching database has a dispatching car event happens in a region and a response to the real time dispatching car event is not made, the calculation server assigns a third number of cars to the region.

12. The car assignment apparatus of claim 11, wherein the third number of cars is determined by the formula:

unsuccessful response number×parameter +N wherein the unsuccessful response number is a number of dispatching car events that is not responded to in a time segment, the N is the basic number to assign car to this region, wherein the N and the parameter are related to the region.

13. The car assignment apparatus of claim 12, wherein the unsuccessful response number is two dispatching car events that are not responded to in five minutes.

* * * * *